Figure 2A:
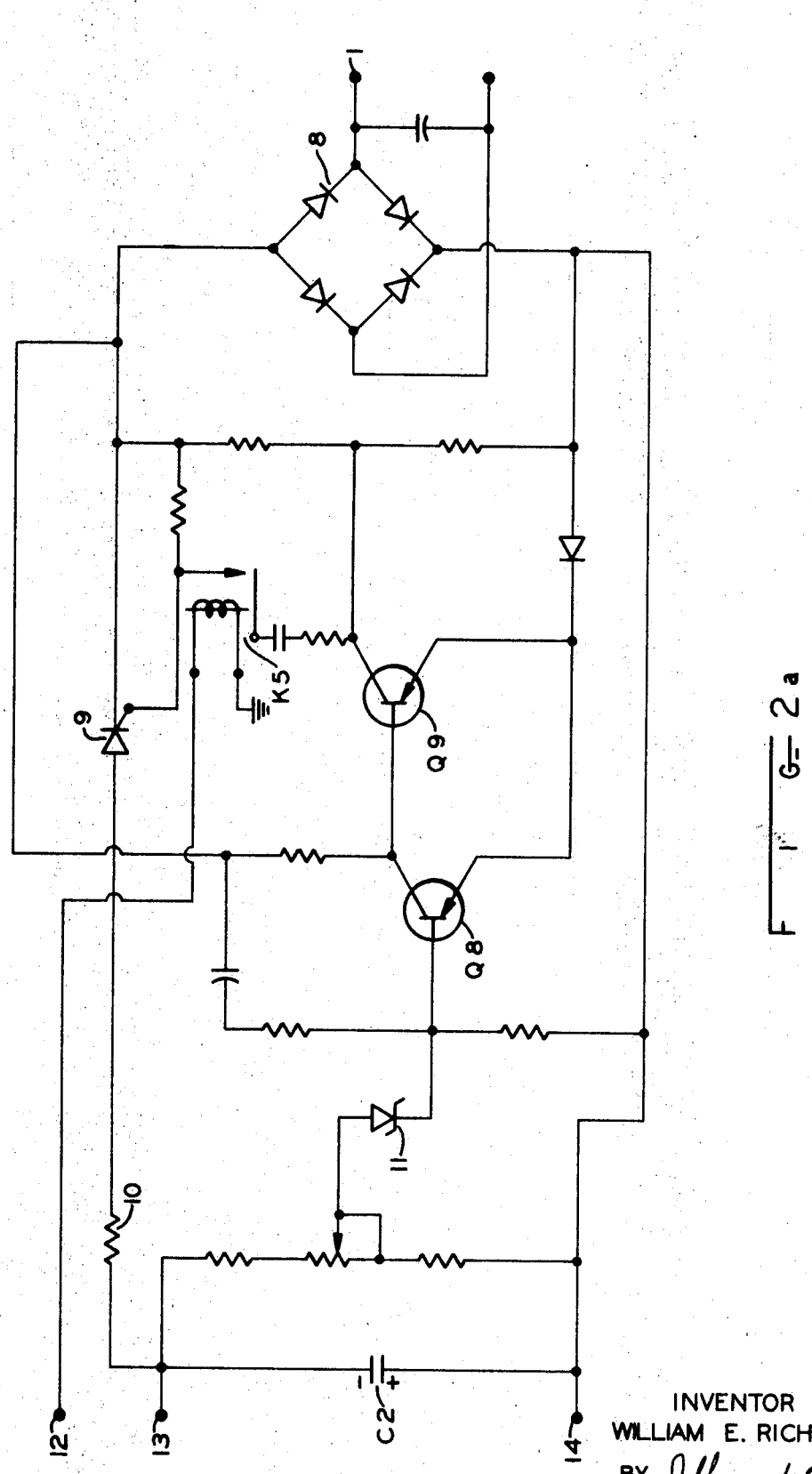

United States Patent

[11] 3,577,060

| [72] | Inventor | William E. Richeson, Jr.<br>Fort Wayne, Ind. |
|---|---|---|
| [21] | Appl. No. | 805,729 |
| [22] | Filed | Mar. 10, 1969 |
| [45] | Patented | May 4, 1971 |
| [73] | Assignee | The Magnavox Company<br>Fort Wayne, Ind. |

[54] ALTERNATING CURRENT POWER SUPPLY EMPLOYING PROGRAMMED TURN-ON AND TURN-OFF
6 Claims, 3 Drawing Figs.

[52] U.S. Cl. ................................................ 321/11,
    318/138, 318/400, 318/414, 321/45
[51] Int. Cl. ....................................................... H02m 1/18,
    H02h 7/14, H02m 5/44
[50] Field of Search ........................................... 321/11-
    – 14, 45, (Inquired); 318/414, 166, 430, 138–400;
    178/69.5, (Inquired)

[56] References Cited
UNITED STATES PATENTS

| 3,341,765 | 9/1967 | Rogers, Jr. et al. | 321/12X |
| 3,377,540 | 4/1968 | Meyer | 321/11 |
| 3,458,796 | 7/1969 | Cassady | 321/45UX |
| 3,473,039 | 10/1969 | Fegley | 321/2X |

FOREIGN PATENTS

| 47,258 | 8/1963 | Poland | 321/45 |

*Primary Examiner*—William H. Beha, Jr.
*Attorney*—Richard T. Seeger

ABSTRACT: A reliability of a high-power alternating power supply wherein a low-power alternating current is used to convert a high-power direct current to said high-power alternating current is improved, when driven by sources and when driving loads that are inductive or inductively coupled, by the use of a programmed turn-on and turnoff procedure wherein the energy supplied to a reactive load is gradually increased and diminished respectively.

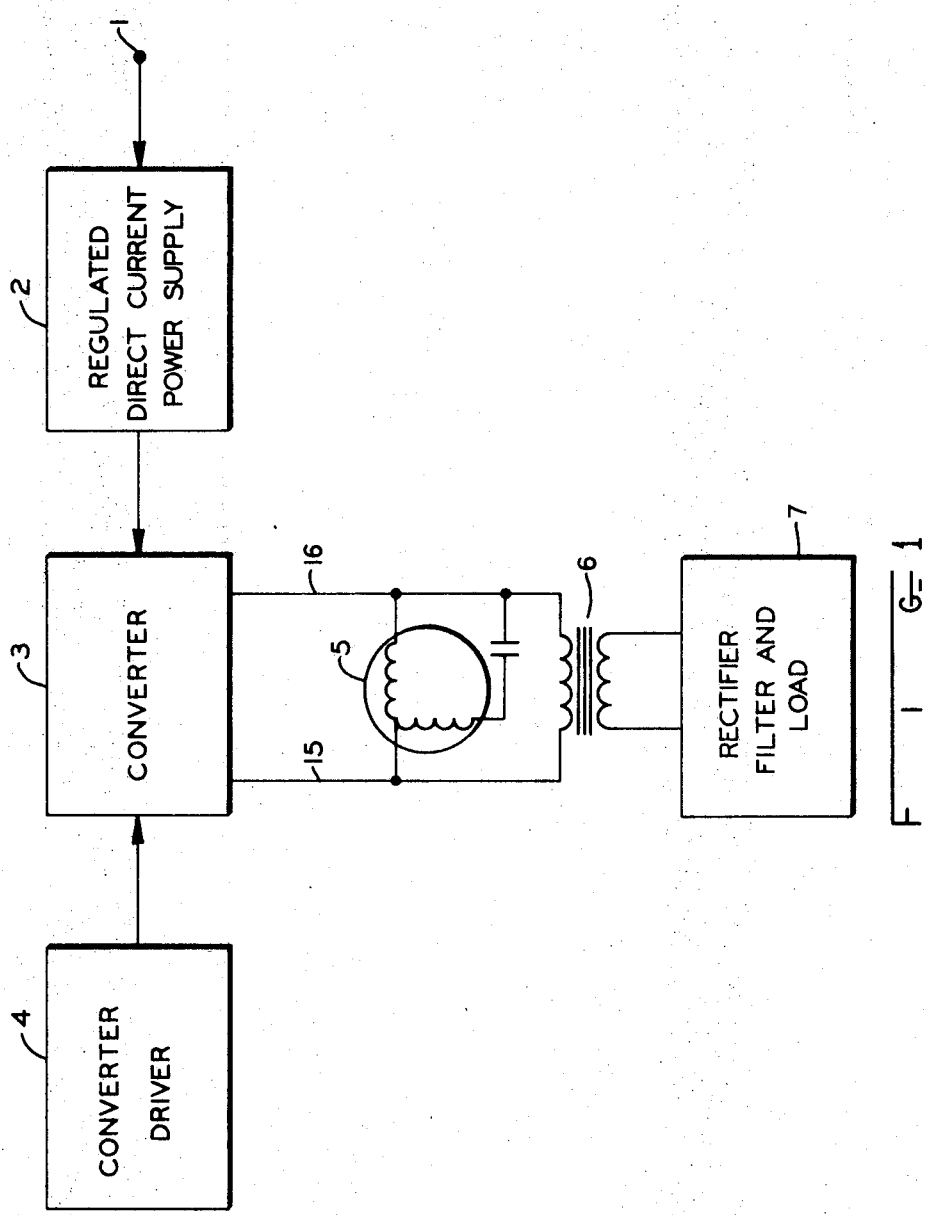

ALTERNATING CURRENT POWER SUPPLY EMPLOYING PROGRAMMED TURN-ON AND TURN-OFF

This invention relates generally to an improved alternating current power supply turn-on and turnoff technique and more particularly to an improved power supply circuit whose reliability is greatly increased by the use of such a turn-on and turnoff technique. In the generation of alternating power and more specially the generation of a nonsinusoidal waveform where the power must be turned on and off and where reactive elements that have various hysteresis, saturation or charging characteristics are involved, certain effects arise that cause occasional high and often damaging current transients. These current transients may be in the load as well as within the circuitry and thus cause damaging loading conditions effecting either the power supply or the load.

The present invention contemplates a 360 c.p.s. square wave power supply. This is provided by a low power 360 cycle power per second square wave generated by a converter driver or clock which is used to switch the output of a high-power-regulated direct current supply. This switching function is accomplished in what is termed a converter. In a given power converter, there may be current transients internally generated that can be independent of the load as such but may cause damage to the converter. For example, in a saturating semiconductor converter, if the saturating semiconductor elements are prevented from going into saturation, the power dissipated in these elements may cause destruction of the converter. One situation that may cause such a condition is an overloading of the output of these elements so that the drive current is insufficient to keep the element in saturation or that the device maximum current capability has been exceeded. Another condition that can cause failure is where the devices are inadequately driven so that they are not saturating and thus have an increased effective resistance. In this situation, even though the load is normal, the dissipation in the device is excessive causing damage. Since either of the two preceding conditions can cause damage to or failure of the power supply, it is one object of the present invention to guard against these conditions.

U.S. Pat. application Ser. No. 471,158, filed July 12, 1965, now U.S. Pat. No. 3,412,314, by Paul J. Crane entitled "Power Supply" shows a method of providing a high-power 360 c.p.s. square wave. This power supply was used in a facsimile transmission system such as that disclosed in U.S. application No. 669,315, filed Sept. 20, 1967 in the names of Reese and Crane entitled "Facsimile System." In this system, the 360 c.p.s. square wave was used to drive a hysteresis-synchronous motor as well as a transformer distribution circuit that was used as a source of direct current. The converter itself was driven from a circuit involving further transformer coupling. Because of the magnetic retentivity in the drive transformer as well as that in the load consisting of a motor and another transformer, it is statistically possible to turn the converter off and then at some later time turn it on again and cause saturation of one of the reactive elements. The current that flows can damage the drive circuitry, can underdrive the converter elements causing damaging dissipation, or can overload the converter elements causing device damage. Another source of high starting current transients is that the transformer drives a rectifier that has a large capacitance load.

In the past, the approach for alleviating these damaging transients was to have sufficient resistance in various parts of the circuit so as to limit the peak currents to safe values. This solution has the basic disadvantage of excessive dissipation of power as well as reduction in the possible voltage regulation and motor speed regulation. Another prior art approach was to use overrated components with such capabilities that they withstood the maltreatment without damage.

Another fault of the prior art was that such voltage-regulated power supplies as typified by that disclosed in the aforementioned Crane application was that when such power supplies were unloaded transients on the incoming power line would cause the regulator to malfunction on a transient basis. This would cause the output voltage to integrate to some value higher than desired. When the load, or in my case the converter, is switched on during such a state there could be an over voltage condition. The converter devices could be overstressed causing failure.

Accordingly, it is one object of the present invention to provide circuitry that prevents any such over voltage situation during the transition from no load to full load.

A further object of the present invention is to provide circuitry that limits the high peak starting currents of a converter.

It is another object of the present invention to prevent the loss of adequate drive to the converting elements due to overloading effects.

It is a further object of the present invention to avoid the loss of sufficient drive to the converting elements due to the drive circuitry.

Another object of the present invention is to enhance the reliability of a converter by always keeping the converting elements in saturation during the converting process.

It is a yet further object of the present invention to maintain a low level of dissipation and a high level of regulation while attaining the above advantages.

Figure 2B:
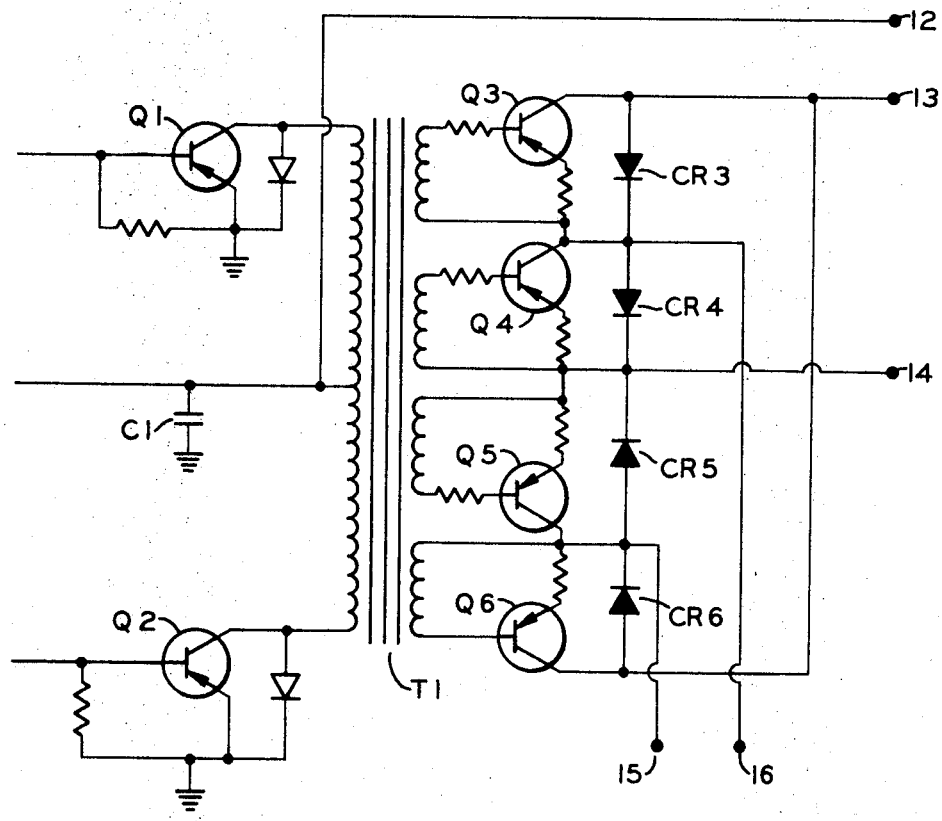

These and other objects and advantages of the present invention will become more apparent from the following detailed disclosure read in conjunction with the drawings in which:

FIG. 1 is a block diagram of a power supply which may incorporate the present invention;

FIGS. 2a and 2b taken together form a schematic diagram of the power supply of FIG. 1 incorporating the present invention.

Turning now to FIG. 1, a primary source of power 1 such as a standard 115-volt 60-cycle source is fed to a regulated direct current power supply 2. The output of the direct current power supply is fed to the converter 3. The converter 3 also receives a low-power 360 c.p.s. square wave from the converter driver or clock 4. The converter 3 functions to switch the high-power direct current according to the dictates of the low-power signals received from the converter driver 4. The output of this converter which is a high-power 360 c.p.s. square wave is fed to a motor 5 and a transformer 6. The secondary of the transformer 6 supplies power to a rectifier filter and load 7.

The general operation of the regulated direct current power supply 2 is discussed in the aforementioned Crane application Ser. No. 471,158 and will be discussed herein only in so far as it is necessary for a complete understanding of the operation of the system or where the prior art circuit has been modified in the present system.

Turning now to the schematic diagram of FIGS. 2a and 2b, where the terminals 12, 13 and 14 of FIG. 2a are to be connected respectively to 12, 13 and 14 of FIG. 2b and where the terminals 15 and 16 feed a load as shown in FIG. 1, a rectifier means 8 consisting of four diodes in a bridge arrangement supplies a pulsating direct current to a silicon controlled rectifier 9. This pulsating direct current charges the capacitor C2 or other energy storage element by way of a resistor 10. The direct current output voltage appears across the capacitor C2. The output voltage of the direct current supply is monitored by a comparator consisting of a resistive network and a voltage standard represented by the Zener diode 11. The results of this comparison are fed back through the transistors Q8 and Q9 and utilized to control the silicon controlled rectifier 9. A relay K5 is provided to interrupt this control loop so as to allow a gradual decay of the voltage across the capacitor C2 when the relay K5 is deenergized.

The power available from the capacitor C2 is converted by the converter 3 of FIG. 1 which uses transistors Q3, Q4, Q5 and Q6 which are connected in a bridge-type circuit along with the catching diodes CR3, CR4, CR5, and CR6. These transistors are conductive in pairs to alternate the polarity of the output voltage between terminals 15 and 16. The transistors are driven through the transformer T1 by the driver 4. The driver 4 is partially shown in the schematic diagram as an intermediate power driver amplifier made up of Q1 and Q2. This amplifier is turned off and on by a current-limited direct current voltage-regulated power supply feeding capacitor C1 or other energy storage element and the center tap of the driver transformer T1.

When it is desired to deliver power to the loads 5, 6, and 7, current is supplied to the capacitor C1 and the relay K5 causing the contacts of the relay K5 to close. The current-limited direct current power supply charges capacitor C1 and the closing of the relay contacts turns on the power supply 2 and the capacitor C2 begins to charge. This has the effect of gradually increasing the direct current output of the power supply 2 as well as the power delivered to the loads 5, 6, and 7. When the power delivered to these loads is to be shut down, the current to the capacitor C1 and the relay K5 is interrupted causing the relay contacts to open and causing the current to C2 to be interrupted. The voltages on C1 and C2 decrease with time as the charges are dissipated in the circuitry of the driver and converter. The discharge time for C1 exceeds that for C2 so that the power decays while the transistors continue to alternately conduct. This causes a gradual diminution of the direct current power as well as the power supply to the loads.

Considering now the transformer T1 during a turn-on, the volt-seconds become successively more with each cycle of drive. The time associated with the attainment of full drive is in one embodiment 7.25 msec. and the periods of the drive are approximately 1.5 msec. This allows a number of cycles of drive before full drive (volt-seconds) is attained. This gradual attainment of full drive prevents the transformer from saturating during turn-on particularly if the retentivity from the off state is very small. In the case of the transformer T1 during a turnoff phase, the volt-seconds of the drive become successively less over a long period of time, in the magnitude of hundreds of milliseconds, due to a long decay time constant associated with the capacitor C1 and the driver 4 current requirements. This occurs at a time when the voltage across the capacitor C1 is decreasing at a slower rate than the voltage across C2. The final magnetic retentivity of the core of the transformer T1 is taken down to a very low value which will in turn further protect a subsequent turn-on phase by preventing a loss of sufficient drive to the transistors Q3, Q4, Q5, and Q6, and will tend to assure their operation in saturation.

The use of the techniques thus far described is made possible by the programmed charging and discharging of the capacitor C2 which allows for the practicality of the aforementioned increasing and decreasing of the drive to the converter 3 by way of transformer T1. The lower drive levels are possible only if the load current is also reduced during the same interval of time. The basic requirement is that there always be adequate drive available to the transistors Q3, Q4, Q5, and Q6 so as to maintain their operation either at saturation or nonconduction. During the turn-on phase the charging of the capacitor C2 is made possible by turning on the power supply by way of the relay K5. The charging time for this capacitor is, in one embodiment, approximately 40 msec. which is considerably greater than the corresponding charging time of the capacitor C1. The buildup of current in the loads 5, 6 and 7 takes place over many converter cycles before the final level of flux in the loads 5 and 6 and the corresponding charge on any capacitance in the filter 7 is achieved. This greatly reduces the initial current flow from what it would be if the output of the converter jumped from zero to its full value. The gradual buildup of flux in the transformer 6 prevents saturation of this element even though there may be a residual flux in its core at the time of starting the circuit. This is also true for the core of the motor 5. The motor 5 in a specific embodiment was a repulsion start synchronous run motor, such motors when running at full speed have their rotors in a saturated state on every application of volt-second impulses to the windings and hence maintain a high level of flux in the rotor at all times. Such motor while running generates a back e.m.f. and thus does not draw an excessive current, (the aforementioned saturation takes place over a very short period of time for each cycle and in itself can be tolerated with a given circuit design), however, if the power to this motor is abruptly cut off the rotor will retain a high residual flux and if the rotor stops in an unfortuitous position, the motor may draw excessive current on restarting. Thus, it is seen that it is highly desirable to gradually diminish the drive to this motor so as to degauss or substantially diminish the residual flux within the rotor.

During the shutdown phase the contacts of relay K5 turn off the power supply 2 allowing the discharge of capacitor C2. This discharge rate is fast as compared to the shutdown rate of the driver circuit 4 so as to always assure that the transistors Q3, Q4, Q5, and Q6 are always operating in a saturating mode during the shutdown phase. In one specific embodiment, the discharge rate of the capacitor C2 was almost one-fifth of the time required for the converter 4 to shut down. The time constants of the circuit are highly nonlinear. Since the prime power voltage from the capacitor C2 is decaying during this phase, the volt-seconds per cycle of power in the load become successively smaller, thereby demagnetizing the core material in the transformer 6 and the motor rotor. The latter is demagnetized since at reduced drive the motor ceases to be a synchronous motor and the rotor field is not rotating with the stator magnetic vector. When the machine has been shut down in this manner, the field retention in the motor and the transformer is very small.

When the turn-on and turnoff program is not used, there can be a Monte Carlo effect whereby the driver transformer T1 may saturate during turn-on, the transformer 6 may saturate during turn-on, the motor may saturate during turn-on (because its rotor came to rest relative to the motor magnetic field), and the current flow to charge any capacitor in the filter 7 may also be excessive. The probability that all of these unfortuitous events may coincide while not large is sufficiently great that failures of the prior art circuit were experienced. Any one or a combination of these undesirable events causes a strain on the power converter 3 and its parts. The plan of action as described in this application allows for the design of power converter that greatly reduces the peak stress of the components used and therefore increases the reliability of the circuit while maintaining high efficiency and high regulation of the system.

Therefore, while the invention has been described in detail with a specific embodiment, other modifications will suggest themselves to those skilled in the art and the scope of the invention is delineated only by the following claims.

I claim:

1. In an alternating current power supply having a clock, a source of direct current power and an alternating current generator, the improvement comprising:
   first means for gradually increasing the direct current power on turn-on of the power supply;
   second means for gradually diminishing the direct current power on turnoff of the power supply;
   said first and said second means having a shared energy storage means whose rate of charging defines said gradual increase and whose rate of discharge determines said gradual diminution;
   said first and said second means having a shared switching means operative on energy storage to energize the direct current power supply and operative on turnoff to deenergize the direct current power supply, said switching means comprising a relay and a silicon-controlled rectifier wherein said relay when energized allows the silicon-controlled rectifier to be triggered and when deenergized prohibits the silicon-controlled rectifier from being triggered; and
   means for maintaining in operation the clock and the alternating current generator while one of said first and said second means is operative.

2. The improvement of claim 1 wherein said alternating current generator comprises a plurality of electron current devices which operate alternately at one of two states.

3. The improvement of claim 6 wherein the two states are nonconduction and saturation.

4. The improvement of claim 2 further comprising means for insuring that said electron current devices are adequately driven during said increase and diminution.

5. The improvement of claim 4 wherein said means for insuring comprises an energy storage element.

6. In an alternating current power supply having a clock, a source of direct current power and an alternating current generator, the improvement comprising:

first means for gradually increasing the direct current power on turn-on of the power supply;

second means for gradually diminishing the direct current power on turnoff of the power supply;

said first and said second means having a shared energy storage means whose rate of charging defines said gradual increase and whose rate of discharge determines said gradual diminution;

said first and said second means having a shared switching means operative on turn-on to energize the direct current power supply and operative on turnoff to deenergize the direct current power supply, said switching means comprising a first switching device and a second switching device wherein said first switching device when energized allows the second switching device to be triggered and when deenergized prohibits the second switching device from being triggered; and means for maintaining in operation the clock and the alternating current generator while one of said first and said second means is operative.